Patented Nov. 11, 1952

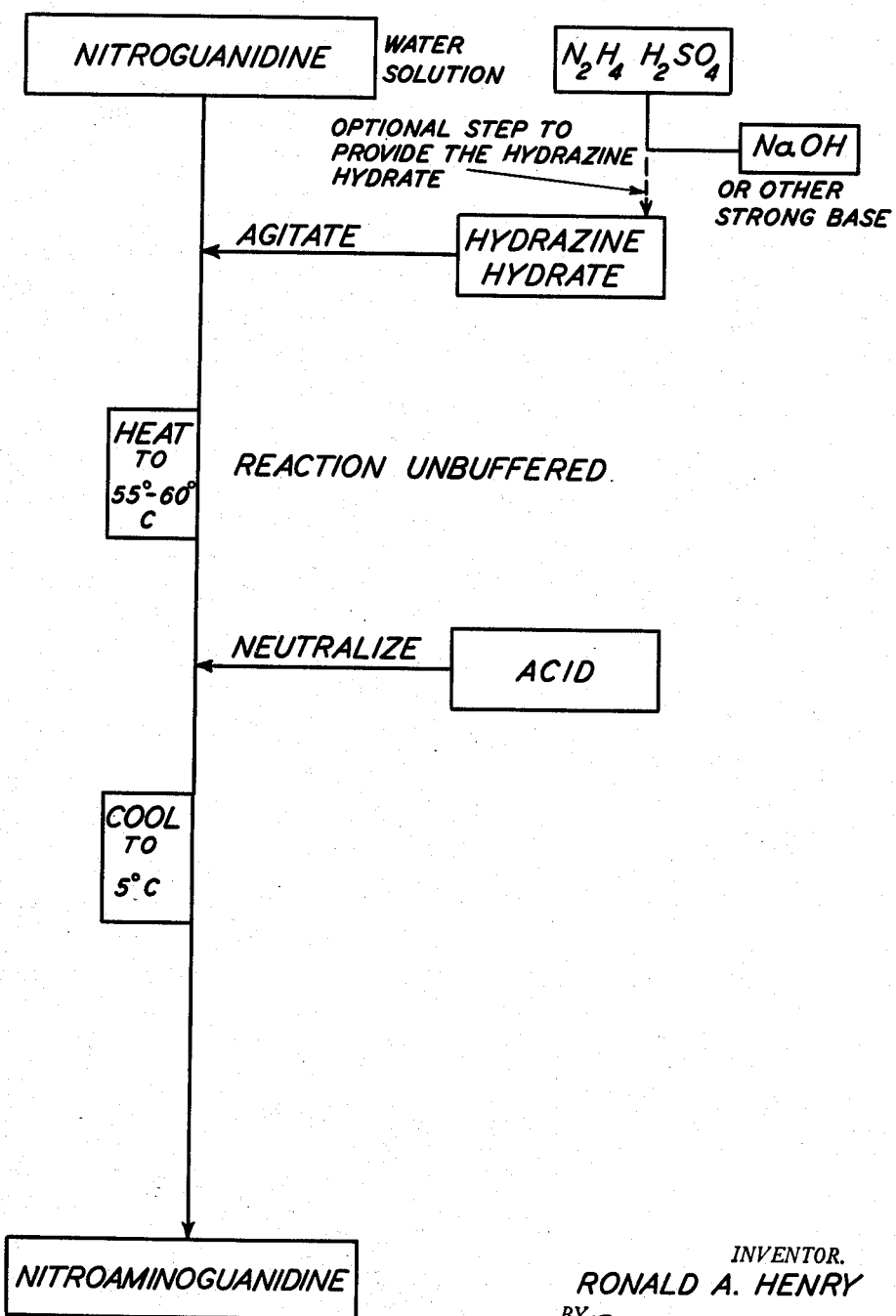

2,617,826

UNITED STATES PATENT OFFICE 2,617,826

PREPARATION OF NITROAMINOGUANIDINE

Ronald A. Henry, Inyokern, Calif.

Application May 3, 1950, Serial No. 159,803

3 Claims. (Cl. 260—564)

(Granted under the act of March 3, 1883, as amended April 30, 1928; 370 O. G. 757)

This invention relates to an improved process for the preparation of nitroaminoguanidine from nitroguanidine.

In the past, nitroaminoguanidine has been produced by reacting equivalent amounts of hydrazine sulfate with nitroguanidine in the presence of two equivalents of one normal ammonium hydroxide solution at 55–60° C. for one hour (see Phillips and Williams article, Journal American Chemical Society, vol. 50, pg. 2465 (1928)). Although that article reported yields in the order of 50%, repeated duplications of the teachings therein by numerous chemists have given yields of only 30–35%. The product obtained was relatively impure, containing from 65–75% nitroaminoguanidine.

It is an object of this invention to improve the yield of nitroaminoguanadine in its production from nitroguanidine.

It is a further object to improve the purity of nitroaminoguanidine in its original production from nitroguanidine.

The single figure of the drawing is a flow diagram illustrating the steps of the process.

By the process of the instant invention, yields of 50% to 60% of nitroaminoguanidine can be consistently obtained by the reaction of hydrazine hydrate with nitroguanidine in an unbuffered water system, provided the system is carefully neutralized after the initial reaction is completed and before the product is isolated. The chemical reaction involved in the instant invention is as follows:

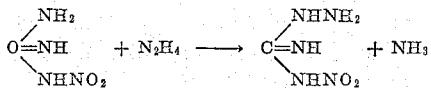

If the system is buffered with equivalent amounts of ammonium chloride or sulfate during the reaction, the yield is only about 30%, in agreement with the results obtained by the procedure of Phillips and Williams, mentioned above. Within the limits considered, the yields seem to increase with increasing alkalinity in the reaction system. If the water system is not neutralized prior to isolating the product, the yield is very low (below 5%) probably because of excessive hydrolysis of the nitroaminoguanidine in the alkaline system.

It presently appears that the two most critical features characterizing the instant invention are, (1) effecting the reaction in an essentially unbuffered solution, i. e. one containing less than 0.5 equivalents of buffer per equivalent of hydrazine; and (2) neutralizing the system prior to isolation of the product.

Other desiderata are that the reaction be effected in an aqueous solution, and that the method be effected at a temperature ranging between 40° and 90° C., with the preferred range being from 50° to 60° C. A further preference is to slowly add a water solution of hydrazine hydrate to a heated water solution of the nitroguanidine, while agitating the solution. Agitation is a convenient means for obviating local excesses of hydrazine hydrate which would otherwise react with the nitroaminoguanadine to form diaminoguanidine and thus lower the yield of nitroaminoguanidine. It is preferred to employ a molar ratio of hydrazine hydrate to nitroguanidine ranging between 0.8 and 1.3, particular preference being for the range from 1.0 to 1.1. A 10% to 20% excess of hydrazine over the stoichiometric quantity does not greatly alter the over-all yield, although generally the first crop of nitroaminoguanidine is somewhat purer than is obtained when only equivalent amounts are reacted.

The preferred period of reaction is from ⅙ to 4 hours, the range from ½ to 2 hours being especially preferred. The time of reaction should be inversely related to the temperature. For example, a 2 to 4 hour heating at 45–50° C. or a 30–60 minute heating at 65–70° C. will give approximately the same yield (50–60%) as under the optimum conditions, i. e. 50 to 70 minutes at 55 to 60° C.

The ratio of water to reactants on a weight basis can vary from 3 to 40, with 10 to 20 being preferred. Similar results can be obtained using mixed solvents such as alcohol and water.

By way of example, two specific methods of practicing the instant invention will now be given.

During 50 to 70 minutes, one equivalent of hydrazine hydrate (85–90%) dissolved in 15 to 20 times its weight of water was slowly added to a well-agitated solution of one equivalent of nitroguanidine in 15 to 20 times its weight of water, heated to and maintained at 55–60° C. After addition of the hydrazine hydrate, 10 to 20 minutes were allowed to complete the hydrazinolysis. The solution was then neutralized with concentrated hydrochloric acid, cooled for several hours, and the impure nitroaminoguanidine removed by filtration, and dried. Evaporation of the mother liquor to one-third of its original volume and cooling gave a second crop of material. The first crop, which contained 83% to 87% of the total yield of nitroaminoguanidine, had a purity of 85% to 95%, based on analysis. The second crop which contained the balance of the nitroaminoguanidine had a purity of only 30% to 40%; the principal impurity was unreacted nitroguanidine. On a corrected basis, the total yield of nitroaminoguanidine was 55% to 60% of the theoretical amount.

Neutralization may be effected by any suitable acid such as HCl, H₂SO₄, HNO₃, H₃PO₄, CH₃COOH, etc.

A second reaction was as follows: A solution of 136 grams of 97% sodium hydroxide and 212 grams of hydrazine sulfate in 1.5 liters of water was added during 50–70 minutes with good agitation to a slurry of 152 grams of nitroguanidine in 3 liters of water at 57–60° C. The agitation and heating were continued for 15 minutes after the addition had been completed. The solution was then neutralized with concentrated hydrochloric acid (approximately 130–140 milliliters were required) and cooled to 5° C., at which temperature it was maintained for several hours. The slightly yellow colored product was removed by filtration, washed with a small volume of cool water, and dried at 60° C. The weight of the product varied from 90 to 95 grams. The purity was about 96% as determined by titration with potassium iodate in acid solution. The yield on a corrected basis was 48 to 51% of the theoretical amount. By recrystallizing the product from water (1 gram per 40 to 50 milliliters), the purity could be raised to better than 99%.

It will be noted that the above example includes a preliminary step of producing the hydrazine hydrate from the preliminary reaction between sodium hydroxide and hydrazine sulfate, the products being sodium sulfate and the desired hydrazine hydrate; the former is not a buffer, so that the required condition of an unbuffered solution is satisfied. This unbuffered solution of hydrazine hydrate is then added to the nitroguanidine to effect the reaction of the instant invention.

By way of comparison, when this same procedure was employed, except that 200 grams of 28% aqueous ammonia were used in place of the 136 grams of sodium hydroxide, the yield was about 38 to 39% of theory, thus demonstrating the striking improvement obtained when operating with an unbuffered system.

Further examples of specific practices of the instant invention are given in the following tables:

TABLE I

*Preparation of nitroaminoguanidine by hydrazinolysis of nitroguanidine*

[All reactants mixed initially and before heating started. Molar ratio of nitroguanidine to hydrazine was 1:1; 1500 ml. of water used per 0.5 mole of nitroguanidine.]

| | Hydrazine added as— | Moles of Buffer per mole of Hydrazine | Reaction Temp., °C. | Time, Minutes | Percent Yield of Nitroaminoguanidine [a] | Remarks |
|---|---|---|---|---|---|---|
| 1 | $N_2H_4 \cdot H_2SO_4$ [b] | $1(NH_4)_2SO_4$ | 50–60 | 60 | 30.9 | Duplication of the procedure recommended by Phillips and Williams. |
| 2 | do [b] | $1(NH_4)_2SO_4$ | 50–60 | 75 | 34.1 | |
| 3 | do | $1(NH_4)_2SO_4$ | 50–60 | 75 | 32.8 | |
| 4 | do [b] | $1(NH_4)_2SO_4$ | 50–60 | 180 | 44.7 | |
| 5 | 87% $N_2H_4 \cdot H_2O$ sol. | None | 47–48 | 60 | None | Solution not neutralized after initial reaction completed. |
| 6 | do [b] | do | 50–60 | 60 | 4.5 | |
| 7 | do [b] | do | 25–30 / 40–45 | 390 / 45 | 42.8 | Solution neutralized with conc. HCl after initial reaction completed. |
| 8 | do [b] | do | 45–50 | 120 | 47.7 | |
| 9 | do [b] | do | 55–60 | 60 | 43.8 | |
| 10 | do [b] | do | 60–65 | 60 | [c] 47.3 | |
| 11 | do [b] | $1(NH_4)_2SO_4$ | 50–60 | 60 | 20.3 | Compare with first three experiments. |
| 12 | do [b] | $1.5(NH_4)_2SO_4$ | 55–60 | 60 | 28.2 | |
| 13 | do [b] | $2NH_4Cl$ | 50–60 | 60 | 29.5 | |
| 14 | do [b] | $4NH_4Cl$ | 55–60 | 60 | 31.8 | |
| 15 | do [b] | $1NH_4Cl$ / $1HCl$ | 50–60 | 60 | 13.8 | Effect of Acid Medium. |

[a] Based on starting weight of nitroguanidine and analyses on the crude products using a Jamieson hydrazine nitrogen titration. No correction has been made for the unreacted nitroguanidine that can be recovered with difficulty.
[b] Plus two equivalents of ammonium hydroxide which furnishes the amount of ammonium sulfate buffer indicated in the next column.
[c] When corrected for the 8.8% of unchanged nitroguanidine that was recovered, the conversion to nitroaminoguanidine is 52.5%.

TABLE II

*Preparation of nitroaminoguanidine by hydrazinolysis of nitroguanidine*

[Aqueous solution of hydrazine hydrate added slowly with agitation to heated aqueous solution-suspension of nitroguanidine; a total of 1500 ml. of water used per 0.5 mole of nitroguanidine, one-third of water used to dilute the hydrazine hydrate. All solutions neutralized with concentrated hydrochloric acid after the initial reaction was completed.]

| | Molar Ratio of Hydrazine to Nitroguanidine | Reaction Temp., °C. | Time, Minutes | Percent Yield of Nitroaminoguanidine [a] | Percent Conversion to Nitroaminoguanidine [b] |
|---|---|---|---|---|---|
| 1 | 1.0 | 30 / 36–39 | 180 / 300 | 48.7 | |
| 2 | 1.0 | 48–49 | 60 | 42.6 | 75.4 |
| 3 | 1.0 | 48–50 | 120 | 54.6 | 59.6 |
| 4 | 1.0 | 46–49 | 240 | 53.4 | 61.8 |
| 5 | 1.18 | 48–49 | 120 | 56.9 | |
| 6 | 1.0 | 55–60 | 30 | 45.4 | 75.8 |
| 7 | 1.0 | 55–60 | 70 | 60.0 | |
| 8 | 1.0 | 58–59 | 70 | 51.9 | |
| 9 | 1.0 | [c] 58–60 | 70 | 51.9 | |
| 10 | 1.0 | 58–59 | 135 | 50.4 | |
| 11 | 1.05 | 55–60 | 70 | 53.1 | |
| 12 | 1.10 | 56–60 | 70 | 57.1 | |
| 13 | 1.10 | 55–60 | 70 | 53.5 | |
| 14 | 1.10 | 55–60 | 70 | 50.7 | |
| 15 | 1.10 | 55–60 | 70 | 48.5 | |
| 16 | 1.0 | 60–65 | 60 | 48.2 | |
| 17 | 1.0 | 65–70 | 30 | 56.1 | |
| 18 | 1.0 | 68–69 | 65 | 51.7 | |
| 19 | 1.0 | 68–69 | 85 | 47.4 | |
| 20 | 1.0 | 78–80 | 20 | 53.7 | |

[a] Based on starting weight of nitroguanidine and analyses on the crude products using a Jamieson hydrazine nitrogen titration. No correction has been made for the unreacted nitroguanidine that can be recovered with difficulty.
[b] Yield corrected for weight of unreacted nitroguanidine.
[c] Temperature never exceeded 60° C.; evaporated under reduced pressure.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purpose without the payment of any royalties thereon or therefor.

What is claimed is:

1. The process of preparing nitroaminoguanidine which consists of the steps of adding a solution consisting of water and hydrazine to a hot solution consisting of water and nitroguanidine, permitting the initial reaction to proceed to completion, immediately adding acid to the reaction mixture until the pH is neutral and recovering the formed nitroaminoguanidine.

2. The process of preparing nitroaminoguanidine which consists of the steps of adding a solution consisting of water and hydrazine to a hot solution consisting of water and nitroguanidine, maintaining the mixture at a temperature of from about 40° C. to 90° C. for a period of from about 10 minutes to about four hours until the initial reaction has gone to completion, immediately adding acid to the reaction mixture until the pH is neutral and recovering the formed nitroaminoguanidine by filtration.

3. The process of preparing nitroaminaguanidine which consists of the steps of adding a solution consisting of water and hydrazine to a hot solution consisting of water and nitroguanidine, the molar ratio of hydrazine to nitroguanidine being between 0.8 and 1.3, maintaining the mixture at a temperature of from about 50° C. to 60° C. for a period of from about 30 minutes to about 2 hours until the initial reaction has gone to completion, immediately adding acid to the reaction mixture until the pH is neutral and recovering the formed nitroaminoguanidine by filtration.

RONALD A. HENRY.

REFERENCES CITED

The following references are of record in the file of this patent:

UNITED STATES PATENTS

| Number | Name | Date |
|---|---|---|
| 2,236,327 | Ashley | June 16, 1942 |

OTHER REFERENCES

Phillips et al., "Jour. Am. Chem. Soc.," vol. 50 (1928), pp. 2465–2470.

Richter, "Organic Chemistry," Elsevier Publishing Co., vol. I (1944), page 516. (Copy in Patent Office Library.)